Patented Aug. 8, 1939

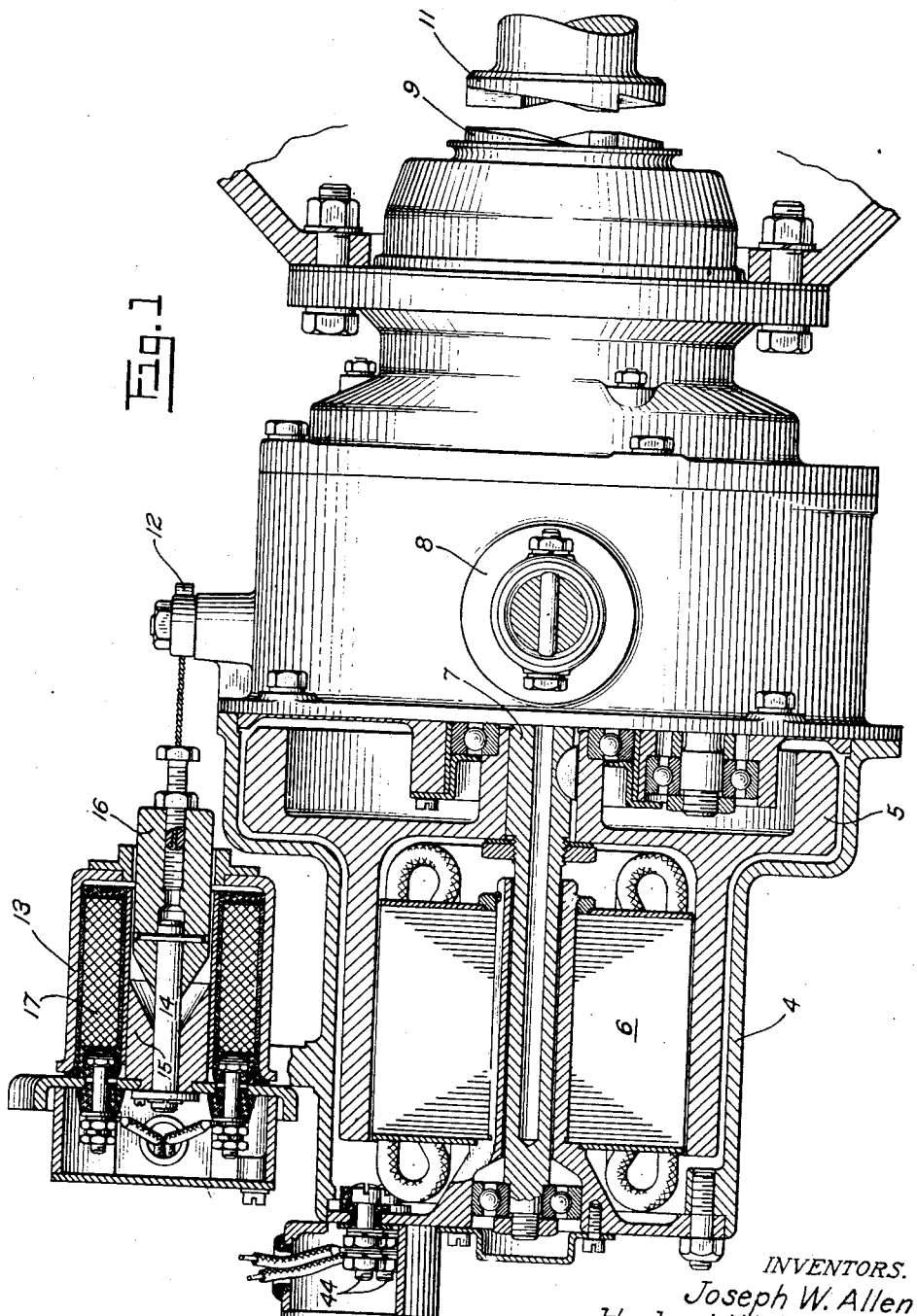

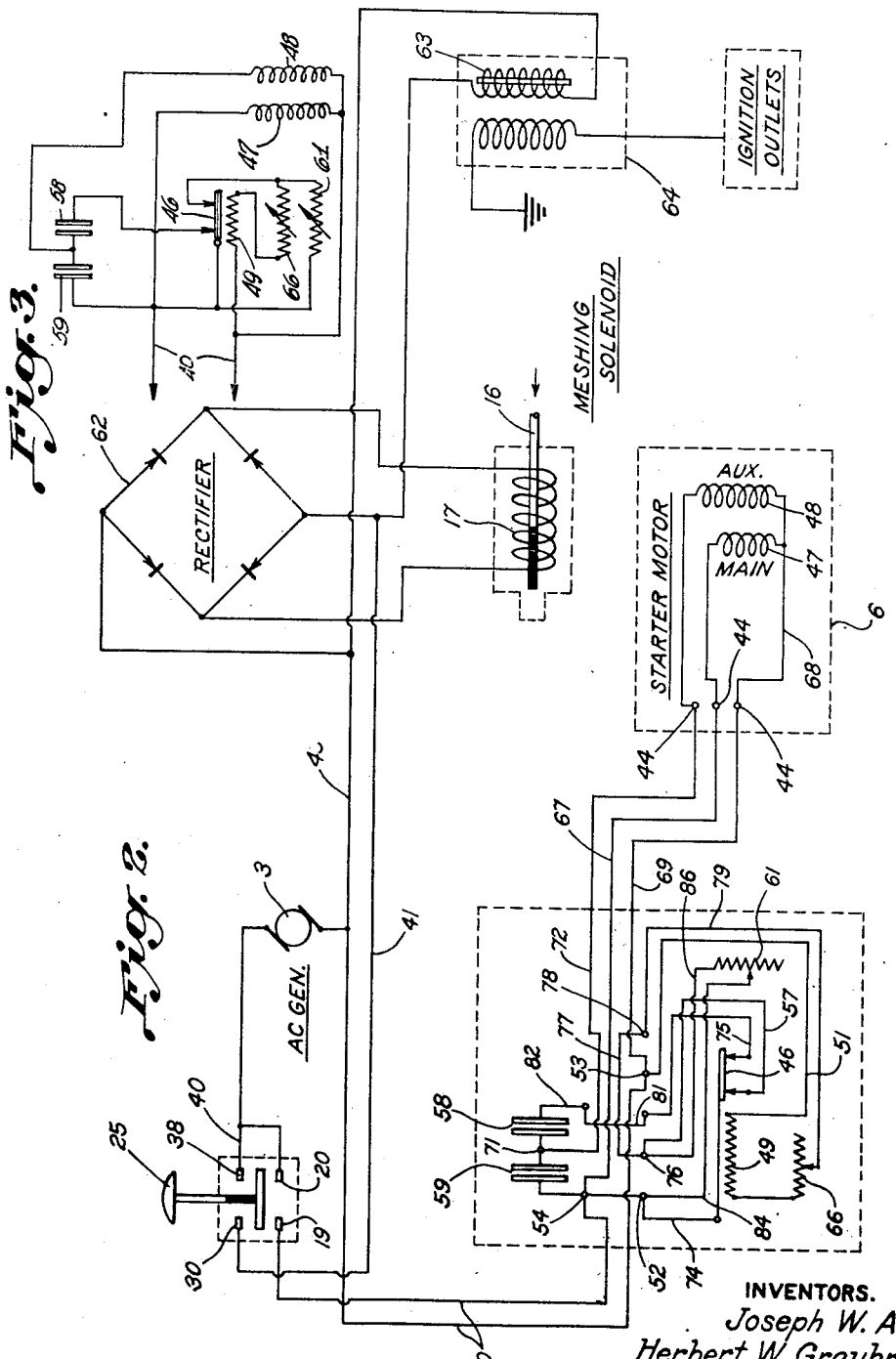

2,168,921

UNITED STATES PATENT OFFICE 2,168,921

POWER CONTROL

Joseph W. Allen, East Orange, and Herbert W. Graybrook, Roselle Park, N. J., assignors to Eclipse Aviation Corporation, East Orange, N. J., a corporation of New Jersey Application October 29, 1936, Serial No. 108,294

3 Claims. (Cl. 290—38)

This invention relates to internal combustion engines, and particularly to the starting thereof, including both the mechanical rotation of the crank-shaft and the simultaneous electrical ignition of the fuel charge to assist in accelerating the crank-shaft to normal running speed.

An object of the invention is to provide means for effecting both mechanical rotation and electrical ignition in the absence of a magneto, battery, or other direct current source, the only source of energy employed being in the form of an alternating current generator.

A second object is to provide mechanical rotating means of the inertia type, corresponding in certain respects to that disclosed in Patent No. 1,760,988 granted to Raymond P. Lansing on June 3, 1930, including the use of an electric motor having a rotor of sufficient mass and radius to produce considerable inertia effect when rotated; but differing from the former disclosure in that the present invention includes no current carrying rotor, nor does it include any commutator, brushes, or other friction producing, rubbing parts—the rotor of the present invention being a simple homogeneous magnetic element spaced apart from the current receiving windings and winding receiving parts.

Another object is to provide a time limit upon the period of maximum power input for the electric motor.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings—

Fig. 1 is a view in elevation, with parts shown in section, of a mechanical rotating means constituting part of one embodiment of the invention;

Fig. 2 is a diagrammatic view of the complete system of which a part is shown in Fig. 1;

Fig. 3 is a diagrammatic view of certain of the electrical parts and connections shown in Fig. 2.

Referring first to the mechanical rotating means shown in Fig. 1, the same is represented as embodied in a casing 4 wherein is rotatably mounted a magnetic inertia element (flywheel) 5 which may be rotating electro-magnetically, as by energizing of motor windings 6, or mechanically, through a gear train having its high speed end rotatable with the flywheel shaft 7 and its low speed end rotatable by application of a crank to the projecting, transversely disposed shaft 8, the last-named parts preferably corresponding in structure to those shown in detail in Patent No. 1,833,948 (Fig. 4) granted to Raymond P. Lansing on December 1, 1931. Motor energization is controlled by a switch 25 having contacts 19, 20, serving as a means to connect the motor windings with the source of current shown at 3.

The starting mechanism shown herein embodies a lever 12 adapted to be actuated, when the flywheel is rotating at a sufficiently high speed, to throw member 9 into engagement with the engine shaft 11, whereby the energy stored in the flywheel is effective to start said engine. Heretofore it has been necessary to actuate lever 12 through suitable mechanical connections which usually terminate in the cockpit of the aeroplane when the starter is employed for starting aeroplane engines. In many instances, and particularly in planes employing more than one engine, such an arrangement is unsatisfactory due to the length and weight of the means employed for actuating lever 12.

The present invention embodies means for electrically actuating lever 12 after the inertia element or flywheel 5 has been brought to a proper speed. In the form shown, said means includes a housing 13 integral with, or secured to, the main housing 4 of the starter. Housing 13 encloses solenoid mechanism including a rod or shaft 14 provided with portions 15 and 16 that extend within solenoid winding or coil 17. The inner end of rod 14 is pivotally connected to one arm of the bell crank lever 12.

After the flywheel has been brought to a sufficiently high speed of rotation, rod 25 is pulled upwardly, as viewed in Fig. 2, to close contacts 30, 38, whereupon current flows from A. C. source 3 through lead 40, contacts 38, 30, and additional electrical parts to be described, to solenoid 17 and ignition coil 64. The energizing of the solenoid 17 acts on plunger 16 to move rod 14 to the left, whereby bell crank lever 12 is rotated and starter jaw 9 is moved outwardly into engagement with jaw 11. The energy of the flywheel is now effective to rotate and start the engine.

If the alternating current flowing from source 3 is of a high frequency, and of high potential as compared with ordinary battery voltage, the wires leading to the starter terminals may be of comparatively small cross-sectional area; hence the use of a step-up relay switch adjacent the starter terminals (as is shown in Patent No. 1,803,908 granted to Raymond P. Lansing on May 5, 1931) is not required. Accordingly hand-switch 25 (Fig. 2) is interposed directly in the circuit from source 3 to the starter terminals 44, as is also the automatic switch 46 now to be described.

In order to secure maximum electro-magnetic effect (power input) during the initial rotation of flywheel 5, the stator windings are split into two or more circuits, one of which, 47, is connected directly across the supply leads 40 and the other, 48, is connected in series with capacitors 58 and 59, which are in parallel branches of an auxiliary circuit to this winding 48. In this auxiliary circuit is a switch 46 adapted to be operated by a current flowing through a heater coil 49 which operates upon a bimetal strip to deflect and open switch 46, and thereby disconnect the capacitor 58, leaving only capacitor 59 in series with the motor winding 48. Opening of switch 46 opens the short circuit across regulable resistor 61, there being a second circuit around switch 46 to the heater coil 49 to insure continued heating of the bimetal strip and hence a holding of the switch 46 open. Time adjustment is secured by means of an additional regulable resistor 66.

The current is rectified (by conventional means 62) before entering the meshing solenoid winding 17, but the current for the primary winding 63 of the induction unit 64 may be tapped directly from the high frequency circuit 41, 43, (upon closure of contacts 30, 38, by movement of hand switch 25, since the contemplated high frequency (which may approach a thousand cycles per second) produces, of itself, a rapidly alternating magnetic flux suitable to send high tension sparks across the spark plug gaps in the various cylinders of the engine to be started.

Return of the switch 25 to the neutral position follows overrunning of the clutch elements 9 and 11, and thereafter the usual spring (not shown) holds the engine engaging member 9 in the retracted position, as explained more fully in the Lansing patent above identified.

The sequence of operation is as follows: The switch 25 is first moved into bridging relationship to the contacts 19 and 20 whereupon current flows from the high frequency source 3 to one of the leads 40 and divides at the junction point 54 to flow in three different paths, one of which paths includes the conductor 67 and the main winding 47 of the flywheel energizing motor, from which the return path is by way of conductors 68 and 69. The second branch includes the capacitor 59, the junction point 71 and lead 72 and the auxiliary winding 48 of the motor while the third branch includes the junction point 52, and the switch 46 where it again divides into two branches, one going to the heater coil 49 and the other to the capacitor 58, the latter being in series with the right-hand contact of the switch 46 (by way of conductors 75, 81 and 82) and also in series with the junction point 71 where the current flowing through the capacitor 58 joins that flowing through the capacitor 59 to energize the auxiliary winding 48 and thus provide maximum power input to the motor so long as the switch 46 remains closed. During this initial period the flow of current to the heater coil 49 is primarily through the circuit including the conductors 74, 46, 57, 76, 77, 78, 79 and 66, the return path being by way of the conductor 51, 53 and the return side of the line 40. Since the resulting temperature rise causes an opening of the switch 46, the current for the heater coil 49 is shunted to the path including the conductor 84, the regulable resistor 61 and the conductors 86, 76, 77, 78 and 79 and the second regulable resistor 66. By reason of this shunt circuit through the resistor 61 the heater coil remains effective to maintain the switch 46 in the open position until such time as the switch 25 is shifted from the motor energizing position to the upper or meshing and ignition producing position—that is, the condition in which a circuit is closed by way of the contacts 38 and 30 to energize both the meshing solenoid 17 and the induction coil 64. When this occurs the starter shown in Fig. 1 is coupled to the engine to be started by way of the clutch elements 9 and 11, and at the same time ignition is produced in the combustion chambers of the engine, whereupon the switch 25 may be returned to the neutral position as previously indicated.

What is claimed is:

1. In a starter for an internal combustion engine, the combination with an engine engaging member of a combined electric motor and inertia means, including a stator element housing all of the current carrying conductors of the motor and a rotor element surrounding said stator element, and means for drivably connecting said rotor element with said engine engaging member.

2. The combination, with a source of alternating current, of a motor having two stationary windings to be energized by current from said source, said motor also including an unwound rotor with a projecting annular portion of considerable mass and radius, means interposed in circuit with said source and windings to limit the period of full energization of one of said windings, and thereby control the period of maximum power input to said motor, an engine engaging clutch, and means for transferring the energy stored in said rotor to the engine by way of said engine engaging clutch.

3. The combination, with a source of alternating current, of a motor having two stationary windings to be energized by current from said source, said motor also including an unwound rotor with a projecting annular portion of considerable mass and radius, means interposed in circuit with said source and windings to limit the period of full energization of one of said windings, and thereby control the period of maximum power input to said motor, an engine engaging clutch, means for transferring the energy stored in said rotor to the engine by way of said engine engaging clutch, and means including an ignition coil having a primary winding connected directly across the terminals of said alternating current source and a secondary winding connected directly to the point of fuel ignition for the purpose of igniting the engine fuel charge during such energy transfer.

JOSEPH W. ALLEN.
HERBERT W. GRAYBROOK.